US010189351B2

(12) United States Patent
Liu et al.

(10) Patent No.: US 10,189,351 B2
(45) Date of Patent: Jan. 29, 2019

(54) AGITATOR TRUCK

(71) Applicant: BYD COMPANY LIMITED, Shenzhen, Guangdong (CN)

(72) Inventors: Huiyue Liu, Shenzhen (CN); Chupeng Quan, Shenzhen (CN); Jian He, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 16/015,795

(22) Filed: Jun. 22, 2018

(65) Prior Publication Data

US 2018/0297469 A1    Oct. 18, 2018

Related U.S. Application Data

(63) Continuation of application No. PCT/CN2016/112654, filed on Dec. 28, 2016.

(30) Foreign Application Priority Data

Dec. 31, 2015  (CN) .......................... 2015 1 1028944
Dec. 31, 2015  (CN) ...................... 2015 2 1137714 U (51) Int. Cl.
*B60K 17/16*     (2006.01)
*B60G 5/06*      (2006.01)
(Continued)

(52) U.S. Cl.
CPC ............ *B60K 17/165* (2013.01); *B60B 35/14* (2013.01); *B60B 35/16* (2013.01); *B60G 5/065* (2013.01);
(Continued)

(58) Field of Classification Search
CPC .... B60K 17/344; B60K 17/165; B60K 23/08; B60K 17/02; B60K 2023/0858; F16D 27/118; Y02T 10/76; Y10T 74/19614
(Continued)

(56) References Cited

U.S. PATENT DOCUMENTS 4,492,389 A    1/1985   Wyatt et al.
5,137,366 A *  8/1992   Hill ...................... B28C 5/4272
                                                           192/69.82
(Continued)

FOREIGN PATENT DOCUMENTS

CN        201881893 U    6/2011
CN        201970815 U    9/2011
(Continued)

OTHER PUBLICATIONS

International Search Report and Written Opinion for Application No. PCT/CN2016/112654, dated Mar. 6, 2017, 9 pages.

*Primary Examiner* — Toan C To
(74) *Attorney, Agent, or Firm* — Sheppard Mullin Richter & Hampton LLP (57) ABSTRACT

The present disclosure discloses an agitator truck, and the agitator truck includes a frame; a first axle assembly; a second axle assembly, where the second axle assembly and the first axle assembly are disposed along a front-rear direction in a spaced manner, the second axle assembly includes two vehicle axle assemblies that are disposed along the front-rear direction in a spaced manner, each of the vehicle axle assemblies includes an axle case assembly, the axle case assembly includes an axle case component and two half axles, and the two half axles are located inside the axle case component; at least one of the two vehicle axle assemblies is an electric drive axle assembly, the electric drive axle assembly further includes an electric power assembly, the electric power assembly includes a power motor, a trans-
(Continued)

mission, and a differential, the transmission has a transmission case, the power motor is fixed to the transmission case, the differential is supported on the transmission case, the differential is located inside the axle case component, and the transmission case is fixed onto the axle case component; and a suspension system, where each of the vehicle axle assemblies is connected to the frame through the suspension system. The agitator trunk according to the present disclosure high has a compact structure and integration degree and is environmental friendly.

20 Claims, 7 Drawing Sheets

(51) Int. Cl.
*B60G 21/02* (2006.01)
*B60L 15/20* (2006.01)
*B60B 35/14* (2006.01)
*B60B 35/16* (2006.01)
*B60K 23/04* (2006.01)
*F16H 61/02* (2006.01)
*B60K 1/02* (2006.01)
*B60K 1/00* (2006.01)

(52) U.S. Cl.
CPC .............. *B60G 21/026* (2013.01); *B60K 1/02* (2013.01); *B60K 23/04* (2013.01); *B60L 15/20* (2013.01); *F16H 61/0204* (2013.01); *B60G 2200/315* (2013.01); *B60G 2200/326* (2013.01); *B60G 2200/343* (2013.01); *B60G 2200/346* (2013.01); *B60G 2200/422* (2013.01); *B60K 2001/001* (2013.01); *B60K 2001/006* (2013.01); *B60K 2023/046* (2013.01); *B60L 2200/36* (2013.01)

(58) Field of Classification Search
USPC .................. 180/354, 360, 374, 375, 378
See application file for complete search history.

(56) References Cited

U.S. PATENT DOCUMENTS

| | | | | |
|---|---|---|---|---|
| 6,523,844 | B2* | 2/2003 | Panizzolo | B60G 9/027 180/378 |
| 6,752,235 | B1* | 6/2004 | Bell | B60G 3/20 180/24.04 |
| 7,143,861 | B2* | 12/2006 | Chu | B60G 3/20 180/346 |
| 8,262,101 | B2* | 9/2012 | Madler | B60G 21/023 180/24.11 |
| 8,517,140 | B2* | 8/2013 | West | B60G 3/20 180/360 |
| 9,371,869 | B2* | 6/2016 | Fukuda | B60K 17/344 |
| 9,598,126 | B2* | 3/2017 | Strong | B62D 61/125 |
| 10,082,196 | B2* | 9/2018 | Janson | F16H 37/0806 |
| 2005/0205329 | A1* | 9/2005 | Fanger-Vexler | B60G 3/145 180/234 |
| 2006/0065451 | A1 | 3/2006 | Morrow et al. | |
| 2006/0220331 | A1* | 10/2006 | Schafer | A01D 75/285 280/6.154 |
| 2008/0308340 | A1* | 12/2008 | Nishimoto | B60K 17/08 180/378 |
| 2018/0134153 | A1* | 5/2018 | Kumar | B60K 17/36 |

FOREIGN PATENT DOCUMENTS

| | | |
|---|---|---|
| CN | 202368295 U | 8/2012 |
| CN | 204264267 U | 4/2015 |
| CN | 205365231 U | 7/2016 |
| CN | 105984335 A | 10/2016 |

* cited by examiner

AGITATOR TRUCK

CROSS-REFERENCE TO RELATED APPLICATIONS

This application is a continuation application of International Application No. PCT/CN2016/112654, filed on Dec. 28, 2016, which is based on and claims priority to and benefits of Chinese Patent Application Nos. 201511028944.0 and 201521137714.3, both filed with the State Intellectual Property Office (SIPO) of the People's Republic China on Dec. 31, 2015. The entire contents of the above-identified applications are incorporated herein by reference.

TECHNICAL FIELD

Embodiments of the present disclosure relate to the field of construction vehicles, and specifically, to an agitator truck.

BACKGROUND

In the related art, a power motor, a transmission, a transmission shaft, and a vehicle axle are all disposed separately, and power is transmitted stage by stage, resulting in a lot of transmission sections, a long transmission link, low transmission efficiency, a large volume, and difficult arrangement. In particular, with regard to some agitator trucks, in order to satisfy requirements for high power, volumes of power motors and transmissions are usually relatively large, axles withstand large torque, and it is difficult to ensure connection strength between vehicle axles and transmissions. Therefore, there is room for improvement.

SUMMARY

The present disclosure aims at resolving one of the technical problems in the related art. Hence, the present disclosure proposes an environmental friendly agitator truck having a drive axle assembly that has a small volume and a high degree of integration.

In embodiments of the present disclosure, an agitator truck includes a frame; a first axle assembly; a second axle assembly, where the second axle assembly and the first axle assembly are disposed along a front-rear direction in a spaced manner, the second axle assembly includes two vehicle axle assemblies that are disposed along the front-rear direction in a spaced manner, each of the vehicle axle assemblies includes an axle case assembly, the axle case assembly includes an axle case component and two half axles, and the two half axles are located inside the axle case component; at least one of the two vehicle axle assemblies is an electric drive axle assembly, the electric drive axle assembly further includes an electric power assembly, the electric power assembly includes a power motor, a transmission, and a differential, the transmission has a transmission case, the power motor is fixed to the transmission case, the differential is supported on the transmission case, the differential is located inside the axle case component, and the transmission case is fixed onto the axle case component; and a suspension system, where each of the vehicle axle assemblies is connected to the frame through the suspension system.

With regard to the agitator truck according to the embodiments of the present disclosure, at least one of two vehicle axle assemblies of a second axle assembly is configured to be an electric drive axle assembly having a compact structure, a short transmission link, high transmission efficiency, and easy arrangement, so that the agitator truck implements a stable and environmental friendly driving process that has zero emission, zero pollution, and low noise; and a frame is connected to each vehicle axle assembly through a suspension system, so that the agitator truck is more comfortable.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Agitator truck 10000, second axle assembly 1000, electric drive axle assembly 100, electric power assembly 101, power motor 11, motor output shaft VI, active cooling structure 111, coolant drive member 1111, coolant circulation passage 1112, inlet A, outlet B, transmission 12, transmission case 121, input shaft I, intermediate shaft II, output shaft III, input gear q, intermediate gear q', first-gear driving gear 1, first-gear driven gear 1', second-gear driving gear 2, second-gear driven gear 2', output gear z, synchronizer S, differential 13, differential driven gear z', electrohydraulic gear shift actuating module 15, axle case assembly 102, wheel reducer 20, wheel reducer case 201, sun gear 202, planet gear 203, inner gear ring 204, inner gear ring support 205, retainer ring 206, axle case component 21, axle case 210, case cover 213, brake mounting plate 214, half axle 22, half axle sleeve 23, hub assembly 24, hub bearing 241, induction gear ring 242, brake 25, brake drum 251, ABS sensor component 26, axial stopper set 27, stop nut 271, locking sheet 272, differential lock mechanism 28, drive cylinder 281, piston 2811, cylinder block 2812, transmission component 282, connecting rod 2821, flange 28211, shifting yoke bar 2822, shifting yoke 2823, spring 2824, sliding sleeve 283, first axle assembly 300, frame 400, suspension system 500, elastic member 50, balance shaft assembly 51, U-bolt 52, first thrust rod 53, second thrust rod 54, first thrust rod frame mounting seat 551, first thrust rod axle case mounting seat 552, second thrust rod balance shaft mounting seat 553, second thrust rod axle case mounting seat 554, elastic member mounting seat 555, bolt 401, bolt 402, bolt 403, bolt 405, bolt 406.

DETAILED DESCRIPTION

Embodiments of the present disclosure are described in detail below, and examples of the embodiments are shown in accompanying drawings. The following embodiments described by referring to the accompanying drawings are illustrative, aim at explaining the present disclosure, and should not be interpreted as limitations to the present disclosure.

An agitator truck 10000 according to an embodiment of the present disclosure is described below by referring to FIG. 1 to FIG. 13. As shown in FIG. 1 to FIG. 13, the agitator truck 10000 according to the embodiment of the present disclosure includes a frame 400, a first axle assembly 300, a second axle assembly 1000, and a suspension system 500.

The first axle assembly 300 and the second axle assembly 1000 are disposed along a front-rear direction of the agitator truck 10000 in a spaced manner. For example, as shown in FIG. 13, the first axle assembly 300 is a front vehicle axle assembly of the agitator truck 10000, and the second axle assembly 1000 is a rear vehicle axle assembly of the agitator truck 10000.

Figure 2:
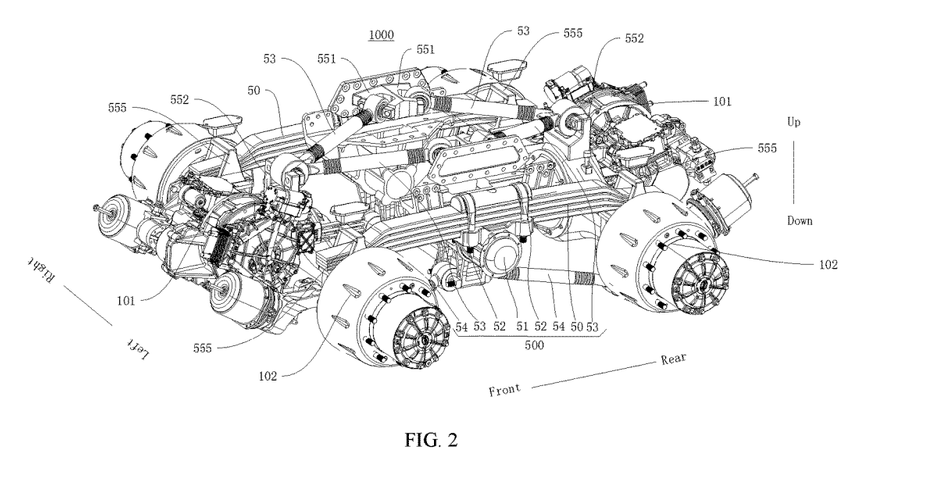
FIG. 2 is a schematic structural diagram of a second axle assembly from a view point according to an embodiment of the present disclosure.
Figure 3:
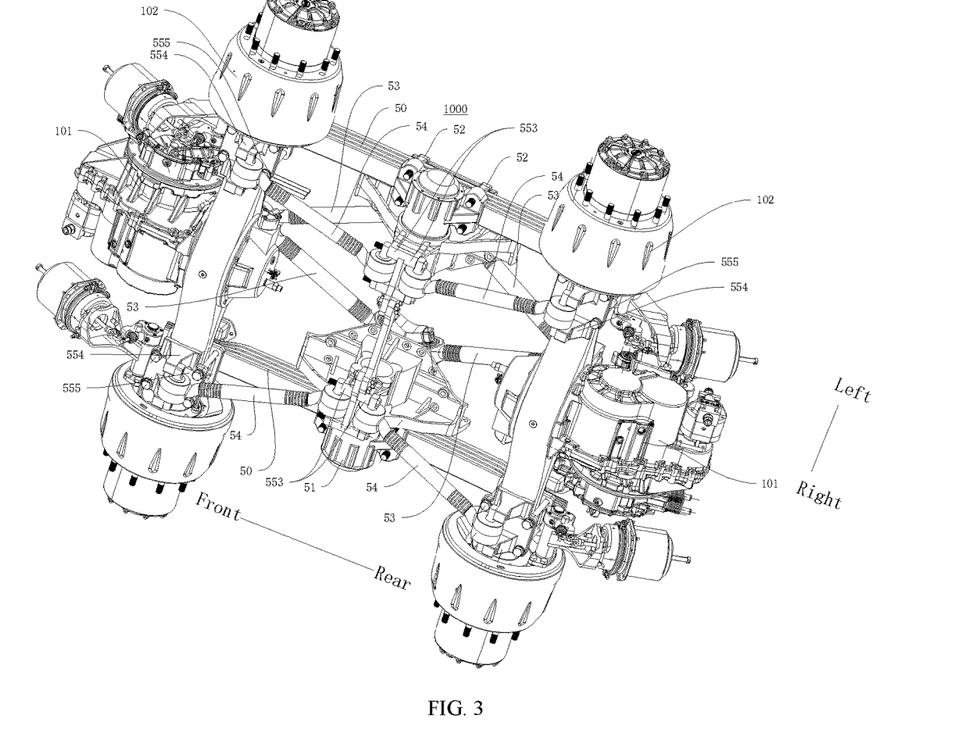
FIG. 3 is a schematic structural diagram of a second axle assembly from another view point according to an embodiment of the present disclosure.
Figure 13:
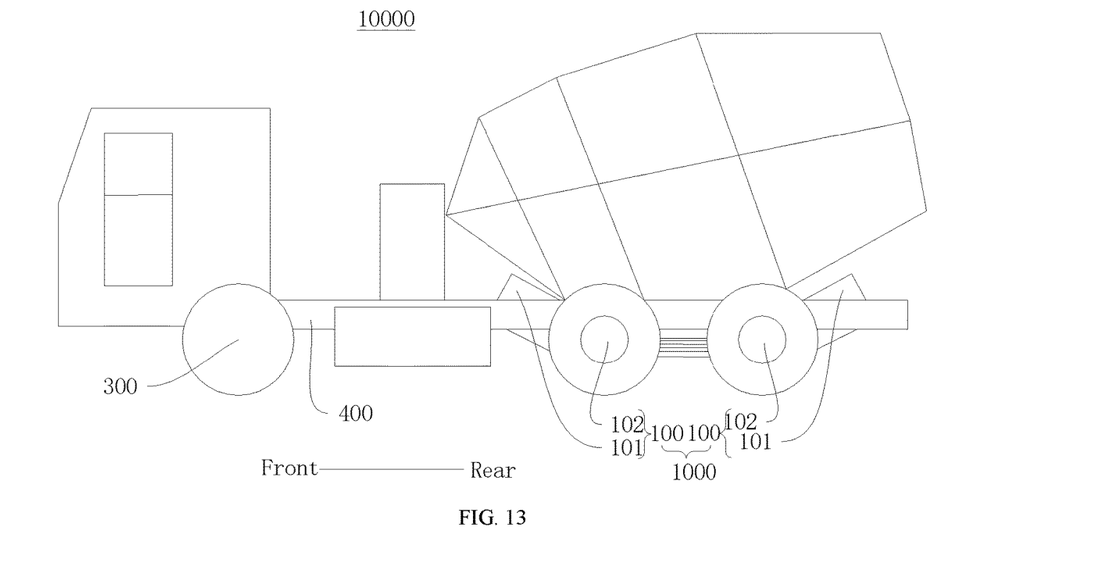
FIG. 13 is a schematic structural diagram of an agitator truck according to an embodiment of the present disclosure.

As shown in FIG. 13, the second axle assembly 1000 includes two vehicle axle assemblies that are disposed along the front-rear direction of the agitator truck 10000 in a spaced manner. As shown in FIG. 2 and FIG. 3, each of the vehicle axle assemblies includes an axle case assembly 102, the axle case assembly 102 includes an axle case component 21 and two half axles 22, and the two half axles 22 are located inside the axle case component 21.

At least one of the two vehicle axle assemblies is an electric drive axle assembly 100. In one embodiment, one of the two vehicle axle assemblies may be the electric drive axle assembly 100, and the other one may be a driven axle; in another embodiment, the two vehicle axle assemblies are both electric drive axle assemblies 100.

In an embodiment where the two vehicle axle assemblies are both electric drive axle assemblies 100, each vehicle axle assembly can drive the agitator truck 10000 to run, so that the second axle assembly 1000 is a drive axle and is powerful, and the agitator truck 10000 can adapt to a level road and a slope with good comprehensive economic efficiency.

In an embodiment, the two electric drive axle assemblies 100 are disposed in such a way that a first electric drive axle assembly 100 is formed by rotating a second electric drive axle assembly 100 about an axis in an up-down direction that is perpendicular to the front-rear direction by 180°. The first electric drive axle assembly 100 is a rear drive axle, the second electric drive axle assembly 100 is a middle drive axle, and the second electric drive axle assembly 100 is formed by rotating the first electric drive axle assembly 100 around an axis in the up-down direction that is perpendicular to the front-rear direction by 180°. Hence, the second axle assembly 1000 has a more compact structure, a convenient arrangement, a high space utilization ratio and even load distribution.

In an embodiment, the two electric drive axle assemblies 100 may be completely identical, so that the middle drive axle and the rear drive axle can be in common use, so as to reduce production and manufacturing costs. Certainly, in some other embodiments of the present disclosure, the two electric drive axle assemblies 100 may be slightly different.

In the embodiment where the two vehicle axle assemblies are both electric drive axle assemblies 100, the agitator truck 10000 may further include two motor controllers, the two motor controllers have one-to-one correspondences with the two electric drive axle assemblies 100, and each motor controller individually controls a power motor 11 of the corresponding electric drive axle assembly 100. Hence, the two electric drive axle assemblies 100 individually work without mutual interference and are respectively controlled by the two motor controllers, and a rotation speed of the power motor 11 is adjusted by an accurate control unit, thereby implementing real-time synchronization. In addition, because the two electric drive axle assemblies 100 can work individually, even though one electric drive axle assembly 100 cannot work, the other electric drive axle assembly 100 also can drive the whole vehicle to run, and there are two individual power sources, namely, the two independent power motors 11, which make the power of the whole vehicle stronger.

In an embodiment where one of the two vehicle axle assemblies is an electric drive axle assembly 100, and the other one of the two vehicle axle assemblies is a driven axle, the electric drive axle assembly 100 drives the driven axle so as to make the agitator truck 10000 to run, and have a simple structure and simple arrangement.

Figure 4:
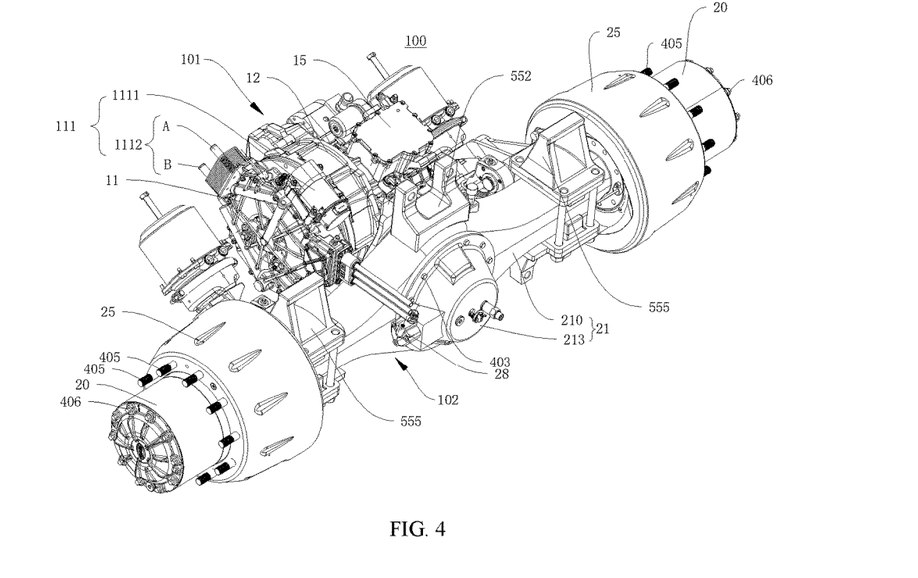
FIG. 4 is a schematic structural diagram of an electric drive axle assembly according to an embodiment of the present disclosure.
Figure 5:
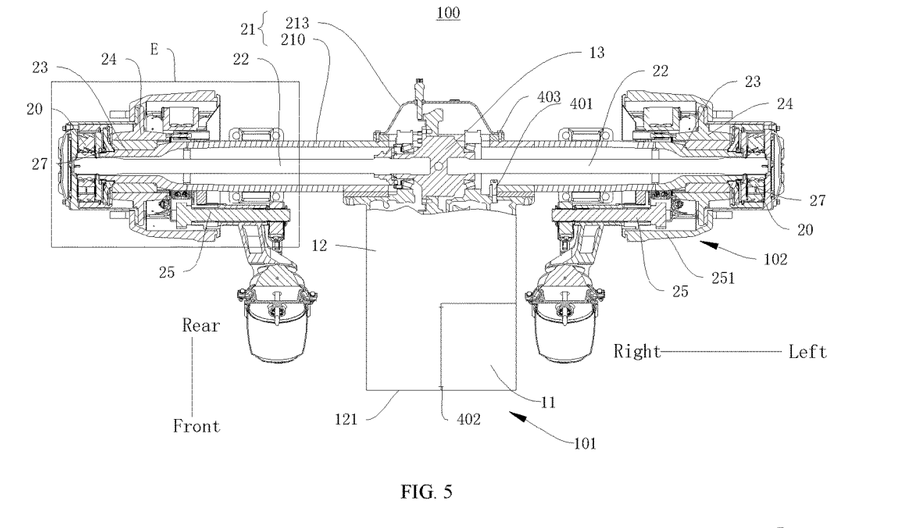
FIG. 5 is a sectional view of FIG. 4.
Figure 6:
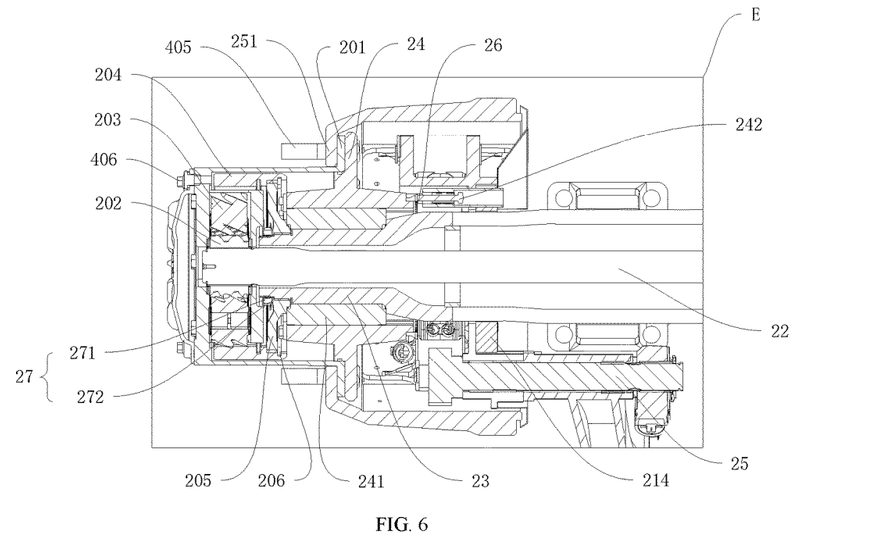
FIG. 6 is an enlarged view of part E in FIG. 5.
Figure 7:
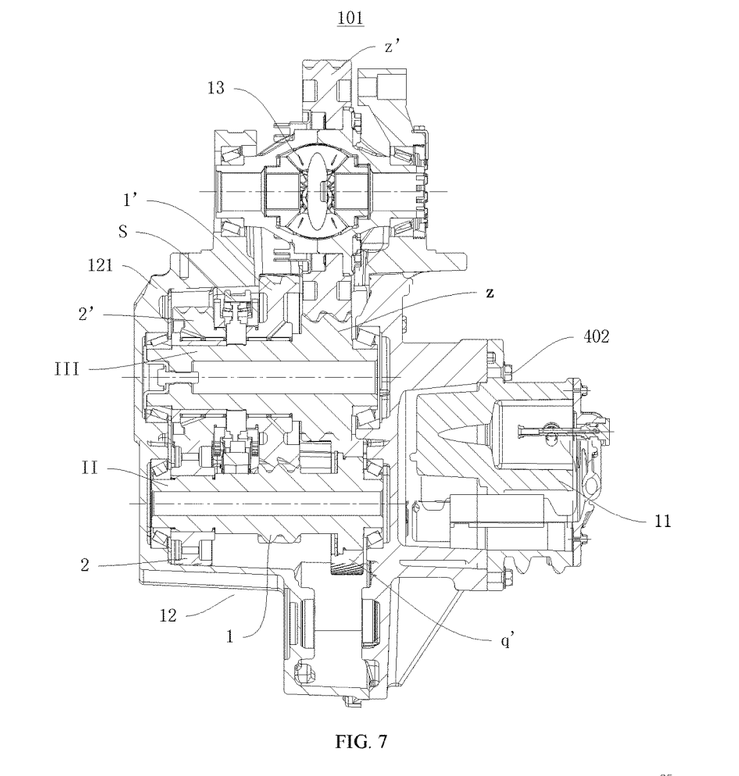
FIG. 7 is a sectional view of an electric power assembly.
Figure 8:
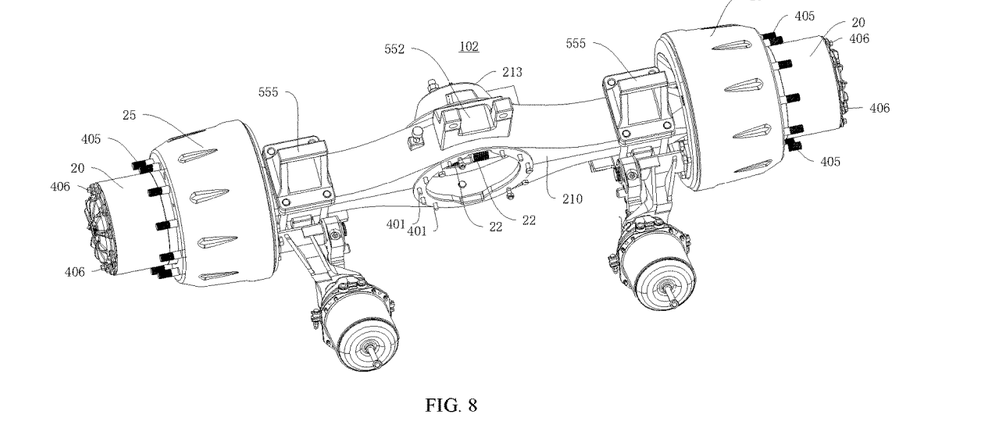
FIG. 8 is a schematic structural diagram of an axle case assembly according to an embodiment of the present disclosure.

As shown in FIG. 4 to FIG. 12, the electric drive axle assembly 100 includes an electric power assembly 101 and an axle case assembly 102. The electric power assembly 101 includes a power motor 11, a transmission 12, and a differential 13. As shown in FIG. 5, FIG. 6, and FIG. 8, the axle case assembly 102 includes an axle case component 21 and two half axles 22. The two half axles 22 and the differential 13 are all located inside the axle case component 21.

It could be understood that power output from the power motor 11 is transmitted to the differential 13 through speed changing and torque adjustment performed by the transmission 12, two output ends of the differential 13 output the power to the two half axles 22, and the two half axles 22 transmit the power to wheels connected thereto, so as to drive the agitator truck 10000 to run.

As shown in FIG. 4 and FIG. 5, in the electric drive axle assembly 100 of the embodiment of the present disclosure, the transmission 12 has a transmission case 121, the power motor 11 is fixed onto the transmission case 121, the differential 13 is supported on the transmission case 121, and the transmission case 121 is fixed onto the axle case component 21. For example, in some embodiments of the present disclosure, the power motor 11 may be fixed onto the transmission case 121 through a thread connecting member, the transmission case 121 may be fixed onto the axle case component 21 through a thread connecting member, and the differential 13 is supported on the transmission case 121 through a bearing.

In the electric drive axle assembly 100, the transmission case 121 may serve as a mounting carrier for the power motor 11, and the transmission case 121 is a connecting component between the electric power assembly 101 and the axle case assembly 102, so as to integrate the power motor 11, the transmission 12, the differential 13 and the axle case assembly 102 together.

By integrating the power motor 11, the transmission 12, the differential 13, and the axle case assembly 102 together, the electric drive axle assembly 100 according to the embodiment of the present disclosure has a compact structure, simple assembly, reduced mass, a small volume, and a small occupied space, can be conveniently installed on the agitator truck 1000 with a shorten transmission link, a small transmission loss and high transmission efficiency.

In an embodiment, the electric drive axle assembly 100 may further include a suspension apparatus, and the suspension apparatus is connected between the electric power assembly 101 and the frame 400. The electric power assembly 101 is not completely borne by the axle case assembly 102, and the electric power assembly 101 is also connected to the frame 400 through the suspension apparatus, so that torque generated by a centroid shift of the electric power assembly 101 to the axle case assembly 102 can be effectively balanced. By disposing the suspension apparatus, an impact can be effectively reduced, so that beat synchronization between the electric power assembly 101 and the axle case assembly 102 is approached as much as possible, and torque between the electric power assembly 101 and the axle case assembly 102 is almost reduced to zero, thereby ensuring reliability of a connection therebetween, ensuring stability of power transmission, and ensuring use safety of the whole electric drive axle assembly 100.

Such arrangement of the electric drive axle assembly 100 is more beneficial to an agitator truck 10000 whose electric power assembly 101 has a large volume and whose power motor 11 has large power, so as to preferably satisfy running requirements of the heavy load-type agitator truck 10000.

The suspension apparatus may be connected between an end, distal from the axle case assembly 102, of the transmission case 121 and the frame 400, so as to facilitate balancing torque caused by the centroid shift of the electric power assembly 101 to the axle case assembly 102, so that mounting of the electric power assembly 101 and the axle case assembly 102 is more stable.

In an embodiment, the suspension apparatus may include two vibration absorbers, and the two vibration absorbers may be symmetrically disposed on left and right sides of the transmission case 121. Hence, the electric power assembly 101 is subject to a force in a more balanced manner. The frame 400 may include a cross beam, an end of each of the vibration absorbers is mounted to the cross beam, and the other end of each of the vibration absorbers is mounted to the transmission case 121.

By disposing the suspension apparatus between the electric power assembly 101 and the frame 400, the electric drive axle assembly 100 according to the embodiment of the present disclosure can effectively reduce an impact, approach beat synchronization between the electric power assembly 101 and the axle case assembly 102 as much as possible, and almost reduce torque between the electric power assembly 101 and the axle case assembly 102 to zero, thereby ensuring reliability of a connection therebetween and ensuring stability of power transmission, so that use of the whole electric drive axle assembly 100 is more reliable and safer.

Each vehicle axle assembly is connected to the frame 400 through the suspension system 500. The suspension system 500 is a connecting component between the frame 400 and each vehicle axle assembly, so that influence on the whole vehicle caused by vibrations of the drive system of the agitator truck 10000 is greatly reduced, and comfortableness of the whole vehicle is improved.

With regard to the agitator truck 10000 according to the embodiment of the present disclosure, at least one of two vehicle axle assemblies of a second axle assembly 1000 is configured to be an electric drive axle assembly 100 having a compact structure, a short transmission link, high transmission efficiency, and easy arrangement, so that the agitator truck 10000 implements a stable and environmental friendly driving process that has zero emission, zero pollution, and low noise; and a frame 400 is connected to each vehicle axle assembly through a suspension system 500, so that the agitator truck is more comfortable.

An agitator truck 10000 according to an embodiment of the present disclosure is described below by referring to FIG. 1 to FIG. 13. As shown in FIG. 13, the agitator truck 10000 includes a frame 400, a first axle assembly 300, a second axle assembly 1000, and a suspension system 500 (not shown).

The first axle assembly 300 and the second axle assembly 1000 are disposed along a front-rear direction of the agitator truck 10000 in a spaced manner, the second axle assembly 1000 includes two vehicle axle assemblies, at least one of the two vehicle axle assemblies is an electric drive axle assembly 100, and each of the vehicle axle assemblies is connected to the frame 400 through the suspension system 500.

Figure 1:
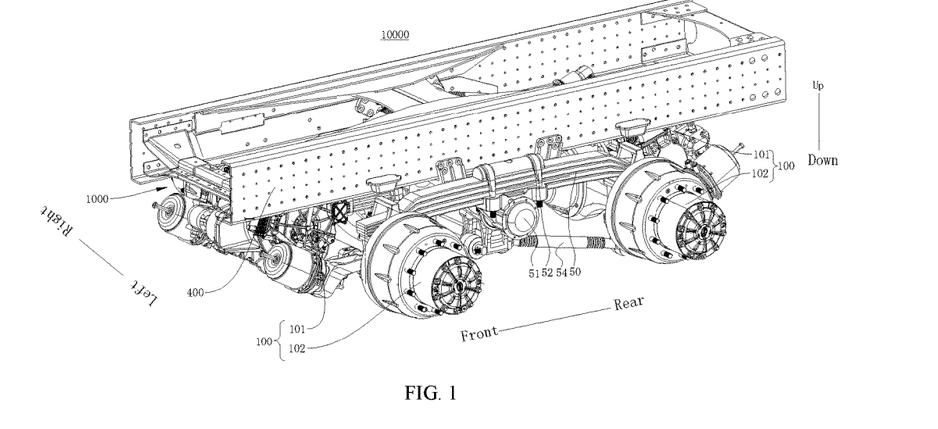
FIG. 1 is a schematic structural diagram of a second axle assembly and a frame according to an embodiment of the present disclosure.

A suspension system 500 according to an embodiment of the present disclosure is described in detail below by referring to FIG. 1 to FIG. 3. As shown in FIG. 1 to FIG. 3, the suspension system 500 includes two elastic members 50 that are disposed along a left-right direction in a spaced manner, a balance shaft assembly 51, and a first thrust rod group and a second thrust rod group that are disposed along an up-down direction in a spaced manner.

The two elastic members 50 are disposed along the left-right direction in a spaced manner, a first elastic member is located on a left side of the agitator truck 10000, and a second elastic member is located on a right side of the agitator truck 10000. Two ends (namely, a front end and a rear end) of each of the elastic members 50 are respectively connected to two axle case components 21, and each of the elastic members 50 is located above the two axle case components 21. In an embodiment, each of the elastic members 50 includes at least one layer of a leaf spring, and preferably, each of the elastic members 50 includes a plurality of layers of leaf springs, and the plurality of layers of leaf springs is disposed in a stacking manner from the top to the bottom.

In other words, a front end of the first elastic member 50 on the left side is connected to a left end of the axle case component 21 of the vehicle axle assembly located in the front, a rear end of the first elastic member 50 on the left side is connected to a left end of the axle case component 21 of the vehicle axle assembly located in the rear, and the first elastic member 50 on the left side is located above the two axle case components 21. A front end of the second elastic member 50 on the right side is connected to a right end of the axle case component 21 of the vehicle axle assembly located in the front, a rear end of the second elastic member 50 on the right side is connected to a right end of the axle case component 21 of the vehicle axle assembly located in the rear, and the second elastic member 50 on the right side is located above the two axle case components 21.

With regard to the agitator truck 10000 according to the present disclosure, because the axle case component 21 is disposed completely below the elastic member 50, the axle case assembly 102 and the electric power assembly 101 are both located below the elastic member 50 (the leaf spring), the influence on the whole vehicle caused by the vibration of the electric power assembly 101 is greatly reduced, comfortableness of the whole vehicle is improved, and a driving process is stable and environmental friendly and has zero emission, zero pollution, and low noise.

The balance shaft assembly 51 is fixed to the frame 400, and the balance shaft assembly 51 is located between the two vehicle axle assemblies in a front-rear direction. The two vehicle axle assemblies are respectively located on two sides of the balance shaft assembly 51, and the middle of each of the elastic members 50 is fixed to the balance shaft assembly 51 The balance shaft assembly 51 may serve as a connecting component between each of the elastic members 50 and the frame 400. The middle of the first elastic member 50 on the left side is fixed to a left end of the balance shaft assembly 51, and the middle of the second elastic member 50 on the right side is fixed to a right end of the balance shaft assembly 51. Hence, each of the elastic members 50 is fixed more firmly, two ends of each of the elastic members 50 are respectively fixed to end portions on the same side of the two axle case components 21, and the middle of each of the elastic members 50 is fixed onto a corresponding end of the balance shaft assembly 51.

For example, each of the elastic members 50 includes at least one layer of a leaf spring, the middle of each of the elastic members 50 is fixed to the balance shaft assembly 51 through a U-bolt 52, and at least one layer of a leaf spring is fixed to a corresponding end of the balance shaft assembly 51 through the U-bolt 52.

In an embodiment, each of the elastic members 50 is fixed to a corresponding end of a balance shaft through two U-bolts 52 that are spaced in a front-rear direction.

As shown in FIG. 1 to FIG. 3, a first thrust rod group includes two first subgroups that are symmetrically disposed in a front-rear direction, the two first subgroups have one-to-one correspondences with the two axle case components 21, each of the first subgroups includes a plurality of first thrust rods 53, and each of the first thrust rods 53 is connected between the frame 400 and a corresponding axle case component 21.

A second thrust rod group includes two second subgroups that are symmetrically disposed in a front-rear direction, the two second subgroups have one-to-one correspondences with the two axle case components 21, each of the second subgroups includes a plurality of second thrust rods 54, and each of the second thrust rods 54 is connected between the balance shaft assembly 51 and a corresponding axle case component 21.

In other words, any one first thrust rod 53 in the first thrust rod group is connected between the frame 400 and the corresponding axle case component 21, and any one second thrust rod 54 in the second thrust rod group is connected between the balance shaft assembly 51 and the corresponding axle case component 21. By connecting the foregoing two thrust rod groups to the balance shaft assembly 51 and the frame 400, the two vehicle axle assemblies have fixed positions relative to the frame 400, and when the second axle assembly 1000 generates power, the truck body is pushed forward.

In an embodiment of the present disclosure, the first thrust rod group is located above the second thrust rod group, a first end of each first thrust rod 53 is connected to the middle of a corresponding axle case component 21. For example, the first end of each first thrust rod 53 is connected to the middle of the corresponding axle case component 21 through a first thrust rod axle case mounting seat 552, the first thrust rod axle case mounting seat 552 is fixed to the middle of the axle case component 21, and the first thrust rod axle case mounting seat 552 is located above the axle case component 21.

A second end of each first thrust rod 53 is connected to the frame 400 through a first thrust rod frame mounting seat 551, the first thrust rod frame mounting seat 551 is fixed to the frame 400, and the first thrust rod frame mounting seat 551 is located between the two axle case components 21.

In other words, each first thrust rod 53 corresponds to one first thrust rod axle case mounting seat 552 and one first thrust rod frame mounting seat 551. A front end of the first thrust rod 53 in the first subgroup located in the front is connected to the middle of the front axle case component 21 through the first thrust rod axle case mounting seat 552, and a rear end of the first thrust rod 53 in the first subgroup located in the front is connected to the frame 400 through the first thrust rod frame mounting seat 551; and a rear end of the first thrust rod 53 in the first subgroup located in the rear is connected to the middle of the rear axle case component 21 through the first thrust rod axle case mounting seat 552, and a front end of the first thrust rod 53 in the first subgroup located in the rear is connected to the frame 400 through the first thrust rod frame mounting seat 551.

In an embodiment, the first end of each of the first thrust rods 53 is located on an inner side of the second end of the same first thrust rod 53, the first thrust rods 53 each are obliquely disposed, and the first thrust rod 53 in the first subgroup located in the front extends outward from the front to the rear, and the first thrust rod 53 in the first subgroup located in the rear extends inward from the front to the rear.

In an embodiment, the first thrust rod frame mounting seat 551 is fixed to an inner side of the frame 400, so that the structure of the suspension system 500 is more compact and can be more conveniently connected and assembled. It could be understood that the frame 400 may include two longitudinal beams that are disposed along a left-right direction in a spaced manner, the first thrust rod frame mounting seat 551 on the left side is located on an inner side of the longitudinal beam located on the left side, and the first thrust rod frame mounting seat 551 on the right side is located on an inner side of the longitudinal beam on the right side.

In some embodiments of the present disclosure, each first subgroup includes two first thrust rods 53, the first ends of the two first thrust rods 53 are integrally formed, there is one first thrust rod axle case mounting seat 552 that corresponds to each first subgroup, and the first ends of the two first thrust rods 53 are connected to the first thrust rod axle case mounting seat 552 at the same time; and there are two first thrust rod frame mounting seats 551 that correspond to each first subgroup, and second ends of the two first thrust rods 53 have one-to-one correspondences with the two first thrust rod frame mounting seats 551.

In other words, the two first thrust rods 53 of each first subgroup constitute a V-shaped thrust rod, the first thrust rod group includes two V-shaped thrust rods, a first end of the V-shaped thrust rod (namely, an intersection point of two sidewalls of a V shape) is connected to the first thrust rod axle case mounting seat 552, and a second end of the V-shaped thrust rod includes two end heads, where one end head is connected to a left part (a longitudinal beam on the left side) of the frame 400 through one first thrust rod frame mounting seat 551, and the other end head is connected to a right part (a longitudinal beam on the right side) of the frame 400 through the other first thrust rod frame mounting seat 551.

In an embodiment, one first thrust rod frame mounting seat 551 that is connected to the left end head of the V-shaped thrust rod located in the front and one first thrust rod frame mounting seat 551 that is connected to the left end head of the V-shaped thrust rod located in the rear may be integrally formed, and one first thrust rod frame mounting seat 551 that is connected to the right end head of the V-shaped thrust rod located in the front and one first thrust rod frame mounting seat 551 that is connected to the right end head of the V-shaped thrust rod located in the rear may be integrally formed. In this way, the two first thrust rod frame mounting seats 551 that are integrally formed have structures that have high strength and are assembled with the frame 400 more easily. In an embodiment, the integrated first thrust rod frame mounting seats 551 may be fixed to the frame 400 through a thread connecting member.

In an embodiment of the present disclosure, the first thrust rod group is located above the second thrust rod group, a first end of each second thrust rod 54 is connected to an end portion of a corresponding axle case component 21, for example, a first end of each second thrust rod 54 is connected to the end portion of the corresponding axle case component 21 through a second thrust rod axle case mounting seat 554, the second thrust rod axle case mounting seat 554 is fixed to the end portion of the axle case component 21, and the second thrust rod axle case mounting seat 554 is located below the corresponding axle case component 21.

A second end of the second thrust rod 54 is connected to the balance shaft assembly 51 through a second thrust rod balance shaft mounting seat 553, the second thrust rod balance shaft mounting seat 553 is fixed to an end portion of the balance shaft assembly 51, and an end portion of an axle case component 21 and the end portion of the balance shaft assembly 51 which correspond to the same second thrust rod 54 are located on the same side of the second axle assembly 1000.

In other words, each second thrust rod 54 separately corresponds to one second thrust rod axle case mounting seat 554 and one second thrust rod balance shaft mounting seat 553, a front end of the second thrust rod 54 on the left side in the second subgroup located in the front is connected to a left end portion of the axle case component 21 in the front through the second thrust rod axle case mounting seat 554, and a front end of the second thrust rod 54 on the right side in the second subgroup located in the front is connected to a right end portion of the axle case component 21 in the front through the second thrust rod axle case mounting seat 554; and a rear end of the second thrust rod 54 on the left side in the second subgroup located in the front is connected to a left end portion of the balance shaft assembly 51 through the second thrust rod balance shaft mounting seat 553, and a rear end of the second thrust rod 54 on the right side in the second subgroup located in the front is connected to a right end portion of the balance shaft assembly 51 through the second thrust rod balance shaft mounting seat 553.

A rear end of the second thrust rod 54 on the left side in the second subgroup located in the rear is connected to a left end portion of the axle case component 21 in the rear through the second thrust rod axle case mounting seat 554, and a rear end of the second thrust rod 54 on the right side in the second subgroup located in the rear is connected to a right end portion of the axle case component 21 in the rear through the second thrust rod axle case mounting seat 554; and a front end of the second thrust rod 54 on the left side in the second subgroup located in the rear is connected to a left end portion of the balance shaft assembly 51 through the second thrust rod balance shaft mounting seat 553, and a front end of the second thrust rod 54 on the right side in the second subgroup located in the rear is connected to a right end portion of the balance shaft assembly 51 through the second thrust rod balance shaft mounting seat 553.

In an embodiment, the second end of each of the second thrust rods 54 is located on an inner side of the first end of the same second thrust rod 54, the second thrust rods 54 each are obliquely disposed, and the second thrust rod 53 in the second subgroup located in the front extends inward from the front to the rear, and the second thrust rod 53 in the second subgroup located in the rear extends outward from the front to the rear.

In some embodiments of the present disclosure, each second subgroup includes two second thrust rods 54, and there are two second thrust rod axle case mounting seats 554 that correspond to the second subgroup. In an embodiment, as shown in FIG. 3, two elastic member mounting seats 555 that are disposed in a left-right direction in a spaced manner are respectively fixed to two ends of the axle case component 21 corresponding to the second subgroup, the two elastic member mounting seats 555 have one-to-one correspondences with the two second thrust rod axle case mounting seats 554, each of the second thrust rod axle case mounting seats 554 is fixed below the corresponding elastic member mounting seat 555, and each of the second thrust rod balance shaft mounting seats 553 is fixed below the balance shaft assembly 51.

In other words, one elastic member mounting seat 555 is fixed onto the left end of the axle case component 21 corresponding to the second subgroup, the corresponding second thrust rod axle case mounting seat 554 on the left end is fixed below the elastic member mounting seat 555 on the left end, and one second thrust rod balance shaft mounting seat 553 is fixed below the left end of the balance shaft assembly 51 corresponding to the second subgroup; and one elastic member mounting seat 555 is fixed onto the right end of the axle case component 21 corresponding to the second subgroup, the corresponding second thrust rod axle case mounting seat 554 on the right end is fixed below the elastic member mounting seat 555 on the right end, and one second thrust rod balance shaft mounting seat 553 is fixed below the right end of the balance shaft assembly 51 corresponding to the second subgroup. In this way, the second thrust rod group is completely disposed below the first thrust rod group, so that the top and the bottom of the vehicle axle assembly are both fixed to the frame 400. Hence, positions of the frame 400 and the vehicle axle assembly can be relatively fixed, the force carrying is more balanced, the load distribution is more even, and the whole arrangement of the agitator truck 10000 is optimized.

In an embodiment, two ends of each first thrust rod 53 and two ends of each second thrust rod 54 all have a rubber ball hinge structure, so that joints between each first thrust rod 53 and the frame 400, between each first thrust rod 53 and the vehicle axle assembly, between each second thrust rod 54 and the balance shaft assembly 51, and between each second thrust rod 54 and the vehicle axle assembly have flexibility to some extent, a favorable vibration absorption effect, and convenient connection.

In an embodiment, in some embodiments as shown in FIG. 1 to FIG. 3, two vehicle axle assemblies are both electric drive axle assemblies 100, and one electric drive axle assembly 100 is formed after rotating the other electric drive axle assembly 100 by 180°, so that the middle drive axle and the rear drive axle can be in common use, only one vehicle axle assembly needs to be developed, and with regard to two V-shaped thrust rods of the first thrust rod group and four second thrust rods 54 of the second thrust rod group, only one state needs to be developed for each, which greatly lowers development costs.

Briefly, with regard to the agitator truck 10000 according to the embodiment of the present disclosure, the electric drive axle assembly 100 integrates the power motor 11, the transmission 12, and the axle case assembly 102 together and has a compact structure and high transmission efficiency, and the second axle assembly 1000 of the agitator truck 10000 completely uses an electric drive manner, has a high energy utilization ratio, a high response speed, and stronger power performance. In addition, the whole power portion of the agitator truck 10000 is located below the elastic member 50, and the vibration source of the whole vehicle is disposed below the elastic member 50. After vibration absorption performed by the suspension system 500, the vibration is weakened, the comfortableness of the whole vehicle is greatly improved, and a plurality of components (for example, the vehicle axle assembly, the V-shaped thrust rod, and the second thrust rod 54) can be in common use, so that development costs are low. In an embodiment, when the two vehicle axle assemblies are both electric drive axle assemblies 100, the two electric drive axle assemblies 100 can work synchronously or individually, so that even though one electric drive axle assembly 100 cannot work, the other electric drive axle assembly 100 can also drive the whole vehicle to run, and the two independent power sources make the power of the whole vehicle stronger.

An electric drive axle assembly 100 according to an embodiment of the present disclosure is described below by referring to FIG. 5 to FIG. 13. As shown in FIG. 5 to FIG. 13, the electric drive axle assembly 100 includes an electric power assembly 101, an axle case assembly 102 and a suspension apparatus. In an embodiment, the electric power assembly 101 may be fixed to the axle case assembly 102 through a plurality of bolts, so as to be integrated as an electric drive axle assembly 100.

As shown in FIG. 4, FIG. 5, FIG. 9, and FIG. 10, the electric power assembly 101 includes a power motor 11, a transmission 12, a differential 13 and an electrohydraulic gear shift actuating module 15, where the transmission 12 has a transmission case 121.

As shown in FIG. 5, the power motor 11 may be fixed onto the transmission case 121 through a plurality of bolts 402, and the plurality of bolts 402 is circumferentially disposed around the power motor 11 in a spaced manner. The power motor 11 may be a permanent magnet synchronous motor. The power motor 11 is externally connected to a power supply through a three-phase cable, so as to implement driving of the power motor 11.

Figure 9:
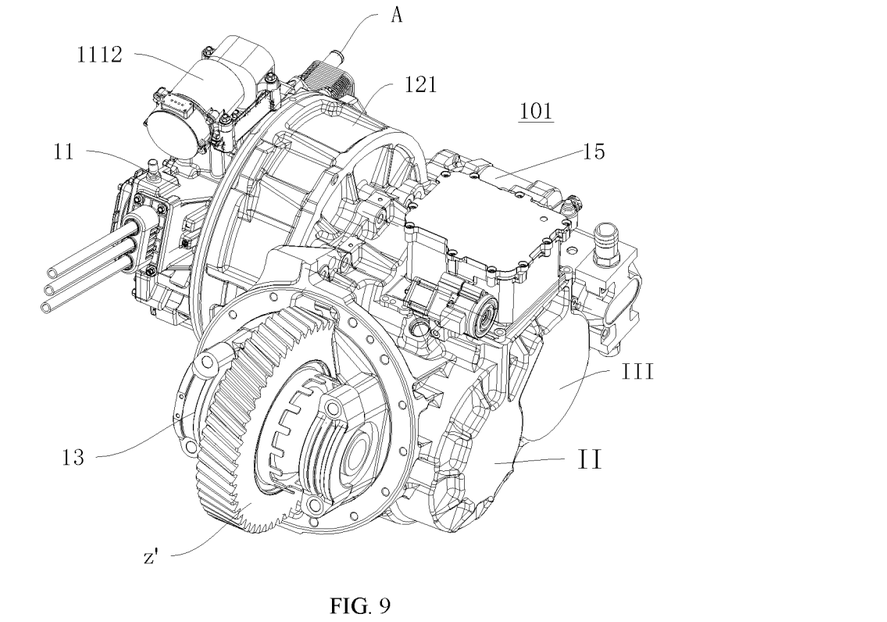
FIG. 9 is a schematic structural diagram of an electric power assembly according to an embodiment of the present disclosure.

As shown in FIG. 9, the power motor 11 includes an active cooling structure 111. The active cooling structure 111 is configured to actively cool the power motor 11. In some embodiments, the active cooling structure 111 includes a coolant circulation passage 1112 that is configured to cool the power motor 11, where the coolant circulates inside the coolant circulation passage 1112 to cool the power motor 11. As shown in FIG. 4, the coolant circulation passage 1112 has an inlet A and an outlet B, and the coolant may enter the coolant circulation passage 1112 through the inlet A and be output through the outlet B after the coolant performs heat exchange with the power motor 11.

Hence, by enabling the power motor 11 to have a built-in active cooling structure 111, the power motor 11 can be prevented from overheating, which indirectly improves efficiency, the power motor 11 is prevented from being burned out, and the power motor 11 can satisfy requirements for operation with large power at a high rotation speed for a long time, can preferably match an operation working condition of the agitator truck 10000, and can be used in the whole series of vehicles from a light vehicle to a heavy vehicle.

In an embodiment, the active cooling structure 111 may further include a coolant drive member 1111, the coolant drive member 1111 is disposed to the coolant circulation passage 1112 to drive the coolant to flow inside the coolant circulation passage 1112. In an embodiment, the coolant drive member 1111 may be a cooling oil pump. Hence, the active cooling structure 111 has a built-in coolant drive member 1111, a high integration degree, and simple assembly.

Certainly, in some embodiments of the present disclosure, the coolant circulation passage 1112 may also be connected to a coolant located outside the electric drive axle assembly 100, the coolant may be introduced from the outside, and the coolant circulation passage 1112 of the active cooling structure 111 may share the coolant drive member 1111 with a coolant circulation passage of another component on the agitator truck 10000.

The transmission case 121 may be fixed to the axle case component 21 of the axle case assembly 102 though a bolt 401. The axle case component 21 includes an axle case 210 and a case cover 213. The middle of the axle case 210 is provided with a differential accommodation space whose two side end faces are both open, the case cover 213 is detachably mounted to the axle case 210 to seal a first open side end face in the middle of the axle case 210, and the transmission case 121 is fixed onto a second open side end face in the middle of the axle case 210.

In an embodiment, the case cover 213 may be detachably mounted to the axle case 210 through a thread connecting member, and specifically, as shown in FIG. 4 and FIG. 5, the thread connecting member is a bolt 403, and the case cover 213 may be connected to the first open side end face in the middle of the axle case 210 in a threaded manner through a plurality of bolts 403 that are circumferentially disposed around the case cover 213 in a spaced manner. In this way, the case cover 213 is detachably mounted to the axle case 210, so that the electric power assembly 101 can be mounted more conveniently and has a simple fixing structure and convenient operation. In an embodiment, a case cover 213 on the first side end face in the middle of the axle case 210 is manufactured to be of an assembly type, which can effectively reduce difficulty in assembly of the electric power assembly 101 and the two half axles 22 and facilitates maintenance of the differential 13.

In an embodiment, the electric drive axle assembly 100 further includes a plurality of bolts 401, the transmission case 121 is provided with a plurality of threaded holes, the axle case 210 is provided with a plurality of through holes having one-to-one correspondences with the plurality of threaded holes, the plurality of bolts 401 has one-to-one correspondences with the plurality of through holes, and each of the bolts 401 penetrates through the corresponding through hole to be fixed into the corresponding threaded hole, so as to fix the transmission case 121 onto the second open side end face in the middle of the axle case 210.

With regard to the electric drive axle assembly 100 according to the embodiment of the present disclosure, the plurality of threaded holes is disposed in the transmission case 121, and the plurality of through holes is disposed on the axle case 210, so that in the situation of ensuring connection strength, the volume of the transmission 12 may be reduced as much as possible, and the structure is more compact.

In an embodiment, as shown in FIG. 5, two half axle sleeves 23 may be respectively fixed onto two ends (namely, the left end and the right end) of the axle case component 21 in a welding manner.

The axle case assembly 102 may further include two wheel reducers 20, two hub assemblies 24, two brakes 25, and two brake mounting plates 214, where each of the hub assemblies 24 is rotatably mounted to a corresponding half axle sleeve 23, the two half axles sleeves 23 are fitted over two half axles 22 in a one-to-one correspondence manner, the two wheel reducers 20 have one-to-one correspondences with the two hub assemblies 24, an input end of each of the wheel reducers 20 is connected to the corresponding half axle 22, and an output end of each of the wheel reducers 20 is connected to the corresponding hub assembly 24.

In some specific embodiments of the present disclosure, as shown in FIG. 5, the wheel reducer 20 is a planet gear reducer. The planet gear reducer includes a sun gear 202, a planet gear 203, and an inner gear ring 204, where the sun gear 202 is fixed onto the half axle 22, so as to rotate synchronously with the half axle 22, the planet gear 203 is engaged with the sun gear 202 and the inner gear ring 204, and the inner gear ring 204 is fixed to the corresponding half axle sleeve 23 through an inner gear ring support 205. Hence, the volume is small, the transmission efficiency is high, and the speed reduction range is broad.

In an embodiment, as shown in FIG. 5, the wheel reducer 20 includes a wheel reducer case 201, the wheel reducer case 201 may be fixed onto the hub assembly 24, so that the volume of the axle case assembly 102 is further reduced, the structure is compact, and the space is saved.

In an embodiment, the inner gear ring support 205 is engaged with the inner gear ring 204, the planet gear reducer may further include a retainer ring 206, and at least part of the inner gear ring support 205 is sandwiched between the retainer ring 206 and the inner gear ring 204 in an axial direction, so as to axially stop the inner gear ring 204, thereby preferably ensuring accuracy in assembly of the wheel reducer 20 and the hub assembly 24.

The two brakes 25 have one-to-one correspondences with the two hub assemblies 24, and one brake 25 corresponds to one hub assembly 24, so as to brake the hub assembly 24. The two brake mounting plates 214 are respectively fixed to two ends of the axle case component 21 in a welding manner, the two brakes 25 are fixed to the two brake mounting plates 214 in a one-to-one correspondence manner through thread connecting members respectively, and brake drums 251 of the two brakes 25 are fixed to the two hub assemblies 24 in a one-to-one correspondence manner.

The axle case assembly 102 may further include two axial stopper sets 27, and the two axial stopper sets 27 have one-to-one correspondences with the two hub assemblies 24, i.e., one axial stopper set 27 corresponds to one hub assembly 24 to axially stop the hub assembly 24. Each inner gear ring support 205 is fitted over the corresponding half axle sleeve 23 through a spline structure, and each axial stopper set 27 includes a stop nut 271 and a locking sheet 272. The stop nut 271 and the locking sheet 272 are both fitted over the corresponding half axle sleeve 23, and the stop nut 271 is connected to the corresponding half axle sleeve 23 in a threaded manner, so as to tightly press the corresponding inner gear ring support 205 and the corresponding hub assembly 24 between the locking sheet 272 and the brake drum 251 of the corresponding brake 25.

It could be understood that the two wheel reducers 20, the two hub assemblies 24, the two half axles sleeves 23, the two brakes 25, the two brake mounting plates 214, the two axial stopper sets 27, and the two half axles 22 all have one-to-one correspondences and are respectively symmetrically located on the left and right ends of the axle case component 21 in a width direction of the vehicle.

The right end is used as an example below to describe connection relationships and position relationships of the wheel reducer 20, the hub assembly 24, the half axle sleeve 23, the brake 25, the brake mounting plate 214 and the axial stopper set 27.

In an embodiment, as shown in FIG. 6, the right end of the axle case component 21 is provided with one half axle sleeve 23 in a welding manner, the hub assembly 24 on the right end is rotatably mounted to the half axle sleeve 23 on the right end, and the half axle sleeve 23 on the right end is fitted over the half axle 22 on the right side. The hub assembly 24 is a part of a wheel, and rotation of the hub assembly 24 can implement rotation of the wheel. More specifically, as shown in FIG. 6, a right end of the half axle 22 on the right end penetrates through the half axle sleeve 23 on the right end to be connected to a sun gear, an end cover is secured to the wheel reducer 20 (for example, a wheel reducer case 201) on the right end through a thread connecting member (the bolt 406 in FIG. 6), a left end of the half axle 22 on the right end is connected to the differential 13 through a spline, the half axle 22 on the right end transmits power output by the differential 13 to an input end of the wheel reducer 20 on the right end, and after speed reduction performed by the wheel reducer 20 on the right end, the power is transmitted from an output end of the wheel reducer 20 on the right end to the hub assembly 24 on the right and then drives the wheel to rotate.

The brake 25 on the right end corresponding to the hub assembly 24 on the right end is mounted to the brake mounting plate 214 on the right end, the brake mounting plate 214 on the right end is fixed onto the right end of the axle case component 21, the brake drum 251 of the brake 25 on the right end is also fixed onto the hub assembly 24 on the right end to rotate together with the hub assembly 24. For example, the brake mounting plate 214 may be fitted over and fixedly welded to the axle case 210 of the axle case component 21, the brake 25 on the right end is fixed to the brake mounting plate 214 on the right end through a thread connecting member, and the brake drum 251 of the brake 25 on the right end may be fixed to the hub assembly 24 on the right end through a bolt 405, where there are a plurality of thread connecting members and a plurality of bolts 405. In an axial direction, i.e., in the left-right direction of the vehicle, the brake 25 on a corresponding end is located between the brake mounting plate 214 on the corresponding end and the hub assembly 24 on the corresponding end.

The axial stopper set 27 corresponding to the hub assembly 24 on the right end is a right end set, the stop nut 271 of the right end set and the locking sheet 272 of the right end set are both fitted over the half axle sleeve 23 on the right end, and the stop nut 271 of the right end set is connected to the half axle sleeve 23 on the right end in a threaded manner to tightly press the inner gear ring support 205 on the right end and the hub assembly 24 on the right end between the locking sheet 272 on the right end and the brake drum 251 of the brake 25 on the right end. Hence, the hub assembly 24 may perform axial locking by cooperation of the stop nut 271 and the brake drum 251 of the brake 25, and similarly, the wheel reducer 20 may also perform axial locking by cooperation of the stop nut 271 and the brake drum 251 of the brake 25. In an embodiment, the wheel reducer case 201, the brake drum 251 of the brake 25, and part of the hub assembly 24 are fixed together through bolts 405.

The locking sheet 272 may prevent the stop nut 271 from loosening. In an embodiment, each hub assembly 24 is rotatably fitted over the corresponding half axle sleeve 23 through a hub bearing 241, and the axial stopper set 27 can adjust a clearance of the hub bearing 241.

According to the foregoing description, a person skilled in the art can derive connection relationships and position relationships of the wheel reducer 20, the hub assembly 24, the half axle sleeve 23, the brake 25, the brake mounting plate 214 and the axial stopper set 27 on the left end, which are not further described in detail.

In an embodiment, the axle case assembly 102 may further include two ABS sensor components 26, and the two ABS sensor components 26 are fixed onto the two brake mounting plates 214 in a one-to-one correspondence manner through a thread connecting member. The ABS sensor component 26 on the left end is fixed onto the brake mounting plate 214 on the left end, and the ABS sensor component 26 on the right end is fixed onto the brake mounting plate 214 on the right end. In an embodiment, the thread connecting member may be a screw.

In an embodiment, a sensor magnetic head of the ABS sensor component 26 and an induction gear ring 242 of the hub assembly 24 generate an induced voltage signal during rotation, the signal is output to a control system (for example, an ECU of the vehicle), and the control system controls locking-up of the control brake 25 during braking.

In an embodiment, as shown in FIG. 4, the electric power assembly 101 may also include an electrohydraulic gear shift actuating module 15, where the electrohydraulic gear shift actuating module 15 is configured to control the transmission 12, and the electrohydraulic gear shift actuating module 15 is mounted to the transmission case 121. A sensor and a precise flow valve that match the electrohydraulic gear shift actuating module 15 are mounted to the electrohydraulic gear shift actuating module 15, an external electronic control unit makes a response by a collected signal and can accurately control a gear shift speed and a gear shift time point of the transmission 12, so that the transmission 12 shifts the gear smoothly, has a high response speed and favorable controllability, and can relieve driving fatigue.

The differential lock mechanism 28 is mounted to the axle case component 21, and the differential lock mechanism 28 is configured to selectively lock one of the two half axles 22 and a differential case of the differential 13 that integrates with an electric drive axle.

A working principle of the differential lock mechanism 28 is that when a driving wheel slips, the differential case and the half axle 22 are locked together to make the differential 13 lose a differential function, so as to transfer entire torque to a driving wheel on the other side, which is very important to a construction vehicle that runs on a muddy road and is likely to slip.

Figure 11:
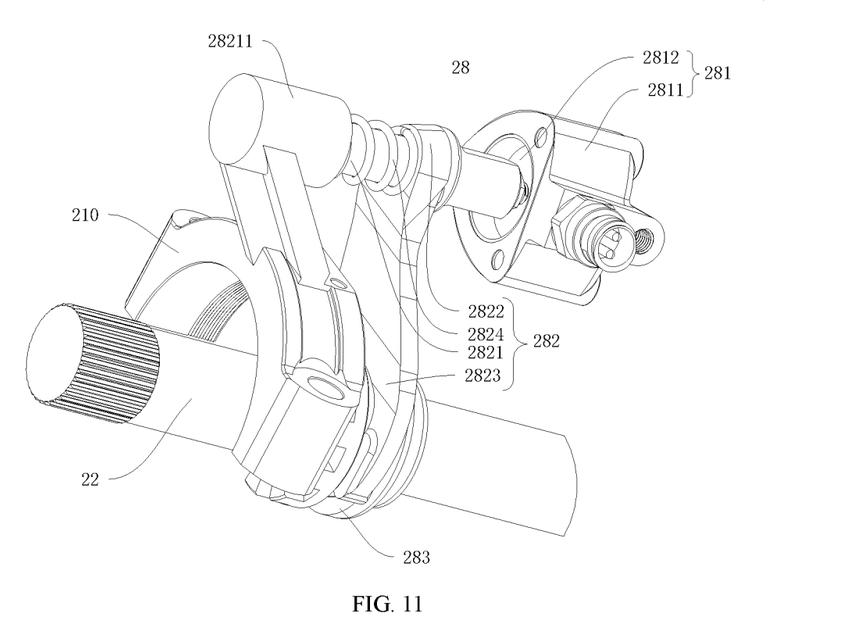
FIG. 11 is a schematic diagram of an internal structure of a differential lock mechanism according to an embodiment of the present disclosure.

As shown in FIG. 11, the differential lock mechanism 28 includes a drive cylinder 281, a transmission component 282, and a sliding sleeve 283. One end of the drive cylinder 281 is fixed to the axle case component 21, the sliding sleeve 283 is fitted over the half axle 22 and can rotate synchronously with the half axle 22, the drive cylinder 281 drives the sliding sleeve 283 through the transmission component 282, so as to enable the sliding sleeve 283 to move between an unlocked position for unlocking the differential case and a locked position for locking the differential case along an axial direction of the half axle 22. When the sliding sleeve 283 is located at the unlocked position, the sliding sleeve 283 and the differential case are unlocked, and at this time, the differential 13 normally implements the differential function, and when the sliding sleeve 283 is located at the locked position, the sliding sleeve 283 and the differential case are locked together, and the differential 13 loses the differential function.

As shown in FIG. 11, the transmission component 282 includes a connecting rod 2821, a shifting yoke bar 2822, a shifting yoke 2823, and a spring 2824. The connecting rod 2821 is fixed to the axle case component 21, the shifting yoke bar is movably fitted over the connecting rod 2821, and the shifting yoke bar is connected to the drive cylinder 281 to drive the shifting yoke bar 2822 to move along an axial direction of the connecting rod 2821. It could be understood that the drive cylinder 281 includes a piston 2811 and a cylinder block 2812, the piston 2811 is movable inside the cylinder block 2812, one end of the shifting yoke bar 2822 is connected to the piston 2811, and the shifting yoke 2823 is fixed to the shifting yoke bar 2822 to move with the shifting yoke bar 2822, where the sliding sleeve 283 is provided with a sliding groove, and the shifting yoke 2823 is located inside the sliding groove, so as to be driven by the shifting yoke bar 2822 to drive the sliding sleeve 283 to move. The spring 2824 is located between one end of the connecting rod 2821 and the shifting yoke bar, and specifically, the one end of the connecting rod 2821 is provided with a flange 28211 that extends outward along the axial direction, the spring 2824 is fitted over the connecting rod 2821, the spring 2824 is located between the flange 28211 and the shifting yoke bar 2822, and the spring 2824 is configured to be compressed in a period when the sliding sleeve 283 moves from the unlocked position to the locked position. Hence, the transmission component 282 has a simple structure and easy arrangement.

The differential lock mechanism 28 shown in FIG. 11 is used as an example, when the drive cylinder 281 ventilates or expires, the shifting yoke bar 2822 is driven by the drive cylinder 281 to move along the axial direction of the connecting rod 2821 and drive the shifting yoke to move, and by cooperation between the shifting yoke 2823 and the sliding groove, the shifting yoke 282 pushes the sliding sleeve 283 to move along the axial direction of the half axle 22. When the sliding sleeve 283 moves from the unlocked position to the locked position, the spring 2824 is compressed, so that the sliding sleeve 283 can recover from the locked position to the unlocked position under the effect of the spring 2824, so as to control engagement or disengagement between teeth on a tooth-shaped end face of the sliding sleeve 283 and teeth on a tooth-shaped end face of the differential 13, so as to finally implement locking-up or differential of the left and right half axles 22.

With regard to the case assembly 102 according to the embodiment of the present disclosure, by disposing the differential lock mechanism 28, the differential 13 can enable the differential function or disable the differential function according to different traveling conditions of the vehicle, which is particularly applicable to the agitator truck 10000 that runs in a severe working condition. The agitator truck 10000 has strong power, and the differential lock mechanism 28 is integrated with the axle case component 21, the structure is complete, the mounting is firm, the working is stable, and the reliability is high, so that the electric drive axle assembly 100 has higher reliability and a more rounded function.

An embodiment of the transmission 12 according to of the present disclosure is described below by referring to FIG. 7, FIG. 9, FIG. 10, and FIG. 12. The transmission 12 may include an input shaft I, an intermediate shaft II and an output shaft III. The input shaft I, the intermediate shaft II and the output shaft III are all borne on the transmission case 121 through a bearing. In an embodiment, as shown in FIG. 9 and FIG. 10, the input shaft I, the intermediate shaft II, and the output shaft III all extend along the width direction of the agitator truck 10000, and the width direction of the agitator truck 10000 is the left-right direction of the agitator truck 10000.

Figure 10:
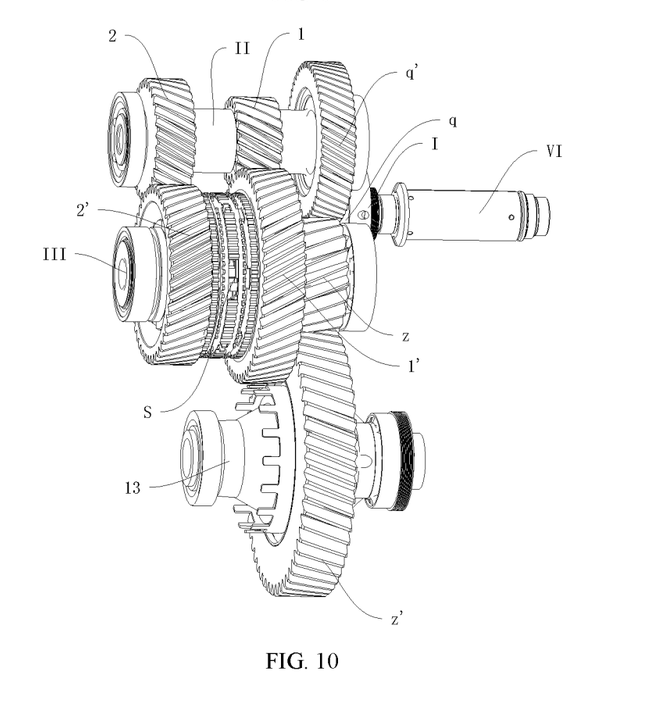
FIG. 10 is a schematic diagram of an internal structure of a transmission according to an embodiment of the present disclosure.
Figure 12:
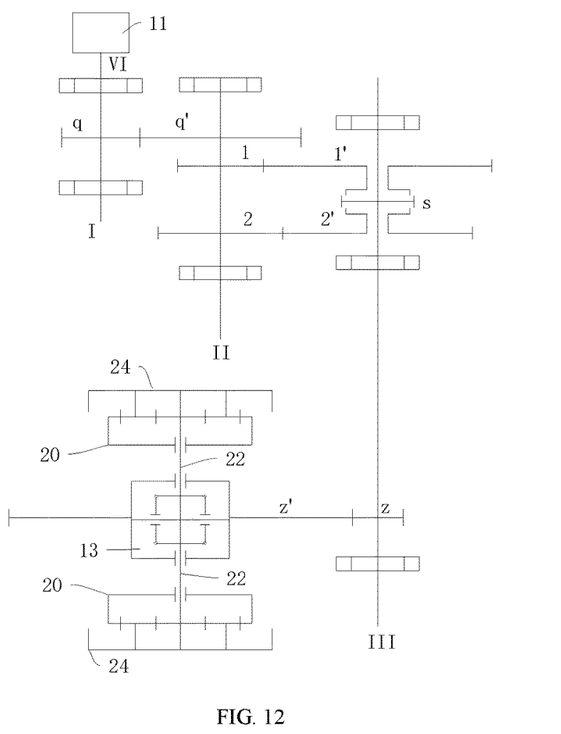
FIG. 12 is a schematic diagram of a transmission structure of an agitator truck according to an embodiment of the present disclosure.

The input shaft I is connected to a motor output shaft VI of the power motor 11, for example, as shown in FIG. 10 and FIG. 12, the input shaft I is connected to the motor output shaft VI through a spline structure, and specifically, the input shaft I has an inner spline, and the motor output shaft VI has an outer spline that fits with the inner spline. Certainly, the input shaft I may also be connected to the motor output shaft VI through a shaft coupling. With regard to the electric power assembly 101 according to the embodiment of the present disclosure, the motor output shaft VI of the power motor 11 is directly connected to the input shaft I of the transmission 12, the transmission link is short, and the structure is simple.

As shown in FIG. 10 and FIG. 12, an input gear q is fixed onto the input shaft I. The input gear q can rotate synchronously with the input shaft I, and an intermediate gear q' is fixed onto the intermediate shaft II. The intermediate gear q' may rotate synchronously with the intermediate shaft II, the intermediate gear q' is engaged with the input gear q, and a plurality of gear driving gears is fixed onto the intermediate shaft II. The plurality of gear driving gears can rotate synchronously with the intermediate shaft II, and a plurality of gear driven gears is freely fitted over the output shaft III. Each gear driven gear may rotate relative to the output shaft III, and the plurality of gear driven gears is engaged with the plurality of gear driving gears in a one-to-one correspondence manner. In an embodiment, the intermediate shaft II and the output shaft III have various lengths and structures, and on the intermediate shaft II and the output shaft III, there may be different numbers of pairs of engaged gears, so that the transmission 12 has output of more gears.

In an embodiment, an output gear z is also fixed onto the output shaft III. The output gear z may rotate synchronously with the output shaft III, and the output gear z may be engaged with a differential driven gear z' of the differential 13, so that power output by the power motor 11 is transferred to the differential 13 through the transmission 12 and drives the half axle 22 and the wheel through the differential 13, to make the agitator truck 10000 run.

In an embodiment, the intermediate shaft II and the output shaft III are disposed along the front-rear direction of the agitator truck 10000 in a spaced manner, and the input shaft I is located above the two shafts, so that the structure of the transmission 12 is more compact, and the transmission 12 is disposed to the electric drive axle assembly 100, so as to further save space.

In an embodiment, the input gear q, the intermediate gear q', the plurality of gear driving gears, and the plurality of gear driven gears are all helical gears. In an embodiment, preferably, the output gear z is also a helical gear. Hence, the transmission gears of the electric power assembly 101 are all helical gears, and the whole transmission 12 has stable transmission, low noise, high transmission efficiency, and large transmission torque.

In an embodiment of the present disclosure, as shown in FIG. 10 and FIG. 12, the plurality of gear driving gears includes a first-gear driving gear 1 and a second-gear driving gear 2, where the first-gear driving gear 1 and the second-gear driving gear 2 are fixed onto the intermediate shaft II along the axial direction of the intermediate shaft II in a spaced manner. The plurality of gear driven gears includes a first-gear driven gear 1' and a second-gear driven gear 2', where the first-gear driving gear 1 is engaged with the first-gear driven gear 1', the second-gear driving gear 2 is engaged with the second-gear driven gear 2', and the first-gear driven gear 1' and the second-gear driven gear 2' are freely fitted over the output shaft III along the axial direction of the output shaft III in a spaced manner. A synchronizer S is configured to selectively join one of the first-gear driven gear 1' and the second-gear driven gear 2' to the output shaft III. The synchronizer S may join the first-gear driven gear 1' to the output shaft III to enable the first-gear driven gear 1' to rotate synchronously with the output shaft III, the synchronizer S may also join the second-gear driven gear 2' to the output shaft III to enable the second-gear driven gear 2' to rotate synchronously with the output shaft III, and the synchronizer S may also be located at an intermediate position where the first-gear driven gear 1' is not joined to the output shaft III and the second-gear driven gear 2' is not joined to the output shaft III. The neutral gear position. The output gear z is fixed onto the output shaft III.

As shown in FIG. 12, the synchronizer S is located between the first-gear driven gear 1' and the second-gear driven gear 2', and the output gear z is located on one side, distal from the first-gear driven gear 1', of the second-gear driven gear 2'. Two ends of the input shaft I may be respectively borne on the transmission case 121 through conical roller bearings on the two ends, two ends of the intermediate shaft II may be borne on the transmission case 121 through two conical roller bearings, and two ends of the output shaft III may be borne on the transmission case 121 through two conical roller bearings.

Briefly, in FIG. 10 and FIG. 12, the transmission 12 is a two-gear transmission 12, has a simple structure, low mass, a high speed ratio, large torque, stronger power performance, and preferable control performance, and can satisfy use requirements of a common vehicle model.

In the description of the present disclosure, it should be understood that, location or position relationships indicated by the terms, such as "center", "longitude", "transverse", "length", "width", "thickness", "up", "down", "front", "rear", "left", "right", "vertical", "horizontal", "top", "bottom", "inside", "outside", "clockwise", "counterclockwise", "axial", "radial", and "circumferential" are location or position relationships based on illustration of the accompanying drawings, are merely used for describing the present disclosure and simplifying the description instead of indicating or implying the indicated apparatuses or elements should have specified locations or be constructed and operated according to specified locations, and therefore, should not be intercepted as limitations to the present disclosure.

In addition, the terms such as "first" and "second" are used merely for the purpose of description, but shall not be construed as indicating or implying relative importance or implicitly indicating a number of the indicated technical feature. Hence, the feature defined with "first" and "second" may explicitly or implicitly include at least one of the features. In the description of the present disclosure, unless otherwise explicitly specifically defined, "a plurality of" means at least two, for example, two or three.

In the present disclosure, unless otherwise explicitly specified or defined, the terms such as "mount", "connect", "connection", and "fix" should be interpreted in a broad sense. For example, a connection may be a fixed connection, or may be a detachable connection or an integral connection; a connection may be a mechanical connection, or may be an electrical connection; a connection may be a mechanical connection, or may be an electrical connection, or may be used for intercommunication; a connection may be a direct connection, or may be an indirect connection via an intermediate medium, or may be communication between interiors of two elements or an interaction relationship between two elements, unless otherwise explicitly defined. It may be appreciated by those of ordinary skill in the art that the specific meanings of the aforementioned terms in the present disclosure can be understood depending on specific situations.

In the present disclosure, unless otherwise explicitly specified or defined, a first feature being "above" or "below" a second feature may be that the first and second features are in direct contact or that the first and second features in indirect contact by an intermediate medium. In addition, the first feature being "over", "above" or "on the top of" a second feature may be that the first feature is over or above the second feature or merely indicates that the horizontal height of the first feature is higher than that of the second feature. The first feature being "underneath", "below" or "on the bottom of" a second feature may be that the first feature is underneath or below the second feature or merely indicates that the horizontal height of the first feature is lower than that of the second feature.

In the descriptions of this specification, a description of a reference term, such as "an embodiment", "some embodiments", "examples", "specific examples", or "some examples", means that a specific feature, structure, material, or characteristic that is described with reference to the embodiment or the example is included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples. Moreover, if there is no contradiction, those skilled in the art can joint and combine different embodiments or examples described in the description and features of different embodiments or examples.

Although the embodiments of the present disclosure have been shown and described, those of ordinary skill in the art can understand that a plurality of changes, modifications, replacements, and variations may be made to these embodiments without departing from the principle and purpose of the present disclosure.

What is claimed is:

1. An agitator truck, comprising:
a frame;
a first axle assembly and a second axle assembly disposed along a front-rear direction in a spaced manner on the frame, wherein the second axle assembly comprises two vehicle axle assemblies that are disposed along the front-rear direction in a spaced manner; and
a suspension system, wherein each of the vehicle axle assemblies is connected to the frame through the suspension system, wherein:

each of the vehicle axle assemblies includes an axle case assembly comprising an axle case component, and two half axles located inside the axle case component; and
at least one of the two vehicle axle assemblies is an electric drive axle assembly comprising an electric power assembly, wherein the electric power assembly comprises:
a transmission having a transmission case fixed to the axle case component;
a power motor fixed onto the transmission case; and
a differential supported on the transmission case and located inside the axle case component.

2. The agitator truck according to claim 1, wherein the suspension system comprises two elastic members disposed along a left-right direction in a spaced manner, two ends of each of the elastic members are respectively connected to the two axle case components, and each of the elastic members is located above the two axle case components.

3. The agitator truck according to claim 2, wherein the suspension system further comprises:
a balance shaft assembly, wherein the balance shaft assembly is fixed to the frame and is located between the two vehicle axle assemblies in the front-rear direction, and the middle of each of the elastic members is fixed to the balance shaft assembly.

4. The agitator truck according to claim 3, wherein the suspension system further comprises a first thrust rod group and a second thrust rod group that are disposed along an up-down direction in a spaced manner;
the first thrust rod group comprises two first subgroups that are symmetrically disposed along the front-rear direction, the two first subgroups have one-to-one correspondences with the two axle case components, each of the first subgroups comprises a plurality of first thrust rods, and each of the first thrust rods is connected between the frame and the corresponding axle case component; and
the second thrust rod group comprises two second subgroups that are symmetrically disposed along the front-rear direction, the two second subgroups have one-to-one correspondences with the two axle case components, each of the second subgroups comprises a plurality of second thrust rods, and each of the second thrust rods is connected between the balance shaft assembly and the corresponding axle case component.

5. The agitator truck according to claim 4, wherein:
a first end of each of the first thrust rods is connected to the middle of the corresponding axle case component, a second end of each of the first thrust rods is connected to the frame through a first thrust rod frame mounting seat, and the first thrust rod frame mounting seat is fixed to the frame and is located in the middle between the two axle case components.

6. The agitator truck according to claim 5, wherein the first end of each of the first thrust rods is connected to the middle of the corresponding axle case component through a first thrust rod axle case mounting seat, and the first thrust rod axle case mounting seat is fixed to the middle of the corresponding axle case component and is located above the corresponding axle case component.

7. The agitator truck according to claim 6, wherein each of the first subgroups comprises two first thrust rods, the first ends of the two first thrust rods are integrally formed, there is one first thrust rod axle case mounting seat that corresponds to the first subgroup, and the first end of each of the two first thrust rods is connected to the first thrust rod axle case mounting seat; and there are two first thrust rod frame mounting seats that correspond to the first subgroup, and second ends of the two first thrust rods have one-to-one correspondences with the two first thrust rod frame mounting seats.

8. The agitator truck according to claim 4, wherein:
a first end of each of the second thrust rods is connected to an end portion of the corresponding axle case component, a second end of each of the second thrust rods is connected to the balance shaft assembly through a second thrust rod balance shaft mounting seat, the second thrust rod balance shaft mounting seat is fixed to an end portion of the balance shaft assembly, and the end portion of the axle case component and the end portion of the balance shaft assembly that correspond to the same second thrust rod are located on the same side of the second axle assembly.

9. The agitator truck according to claim 8, wherein the first end of each of the second thrust rods is connected to the end portion of the corresponding axle case component through the second thrust rod axle case mounting seat, and the second thrust rod axle case mounting seat is fixed to the end portion of the corresponding axle case component and is located below the corresponding axle case component.

10. The agitator truck according to claim 1, wherein the two vehicle axle assemblies are both electric drive axle assemblies, and the two electric drive axle assemblies are disposed in such a way that one of the electric drive axle assemblies is formed after rotating the other electric drive axle assembly around an axis in the up-down direction perpendicular to the front-rear direction by 180°.

11. The agitator truck according to claim 10, further comprising: two motor controllers, wherein the two motor controllers have one-to-one correspondences with the two electric drive axle assemblies, and each of the motor controllers individually controls the power motor of the corresponding electric drive axle assembly.

12. The agitator truck according to claim 1, wherein the power motor comprises an active cooling structure, and the active cooling structure comprises a coolant circulation passage configured to cool the power motor; and
the active cooling structure further comprises a coolant drive member, and the coolant drive member is disposed to the coolant circulation passage to drive a coolant to flow inside the coolant circulation passage.

13. The agitator truck according to claim 1, wherein the axle case component comprises:
an axle case, wherein the middle of the axle case is provided with a differential accommodation space whose two side end faces are both open; and
a case cover, wherein the case cover is detachably mounted to the axle case to seal a first open side end face in the middle of the axle case, and the transmission case is fixed onto a second open side end face in the middle of the axle case.

14. The agitator truck according to claim 1, wherein two half axle sleeves are respectively fixed to two ends of the axle case component in a welding manner, the axle case assembly further comprises two hub assemblies, each of the hub assemblies is rotatably mounted to the corresponding half axle sleeve, and the two half axle sleeves are fitted over the two half axles in a one-to-one correspondence manner.

15. The agitator truck according to claim 1, wherein the transmission comprises an input shaft, an intermediate shaft, and an output shaft, the input shaft is connected to a motor output shaft of the power motor, an input gear is fixed onto the input shaft, an intermediate gear engaged with the input gear is fixed onto the intermediate shaft, a plurality of gear driving gears is fixed onto the intermediate shaft, an output gear engaged with a differential driven gear of the differential is fixed onto the output shaft, and a plurality of gear driven gears engaged with the plurality of gear driving gears in a one-to-one correspondence manner is freely fitted over the output shaft.

16. The agitator truck according to claim 1, wherein the axle case assembly further comprises a differential lock mechanism, and the differential lock mechanism is mounted to the axle case component and is configured to selectively lock one of the two half axles and a differential case of the differential.

17. The agitator truck according to claim 16, wherein the differential lock mechanism comprises:
a drive cylinder, wherein one end of the drive cylinder is fixed to the axle case component;
a transmission component; and
a sliding sleeve, wherein the sliding sleeve is fitted over the half axle and may rotate synchronously with the half axle, and the drive cylinder drives the sliding sleeve through the transmission component, so as to enable the sliding sleeve to move between an unlocked position for unlocking the differential case and a locked position for locking the differential case along an axial direction of the half axle.

18. The agitator truck according to claim 17, wherein the transmission component comprises:
a connecting rod, wherein the connecting rod is fixed to the axle case component;
a shifting yoke bar, wherein the shifting yoke bar is movably fitted over the connecting rod, and the shifting yoke bar is connected to the drive cylinder to drive the shifting yoke bar to move along an axial direction of the connecting rod;
a shifting yoke, wherein the shifting yoke is fixed to the shifting yoke bar, the sliding sleeve is provided with a sliding groove, and the shifting yoke is located inside the sliding groove; and
a spring, wherein the spring is located between one end of the connecting rod and the shifting yoke bar and is configured to be compressed when the sliding sleeve moves from the unlocked position to the locked position.

19. The agitator truck according to claim 1, wherein the electric power assembly further comprises an electrohydraulic gear shift actuating module, and the electrohydraulic gear shift actuating module is configured to control the transmission and is mounted to the transmission case.

20. The agitator truck according to claim 1, wherein the electric power assembly further comprises a suspension apparatus, connected between the electric power assembly and the frame; and the suspension apparatus comprises two vibration absorbers symmetrically disposed on left and right side of the transmission case.

* * * * *